United States Patent Office 3,417,607
Patented Dec. 24, 1968

3,417,607
APPARATUS FOR CONTROLLING THE POSITION OF A MEMBER IN ACCORDANCE WITH THE DENSITY OF A GAS
Christopher Linley Johnson, Allestree, England, assignor to Rolls-Royce Limited, Derby, England, a British company
Filed May 17, 1965, Ser. No. 456,104
Claims priority, application Great Britain, June 4, 1964, 23,303/64
3 Claims. (Cl. 73—30)

ABSTRACT OF THE DISCLOSURE

A gas turbine engine fuel system includes an apparatus responsive to the density of a gas, the apparatus controlling the position of a part of a balance mechanism for adjusting the fuel flow to the engine. The apparatus includes a chamber with a sealed bellows containing a reference gas therein, the outside of the bellows being subjected to compressor inlet air pressure. A servo mechanism is responsive to movements of the bellows due to any pressure differences thereacross, the said part of the balance mechanism being connected to the servo mechanism.

---

Figure 1:
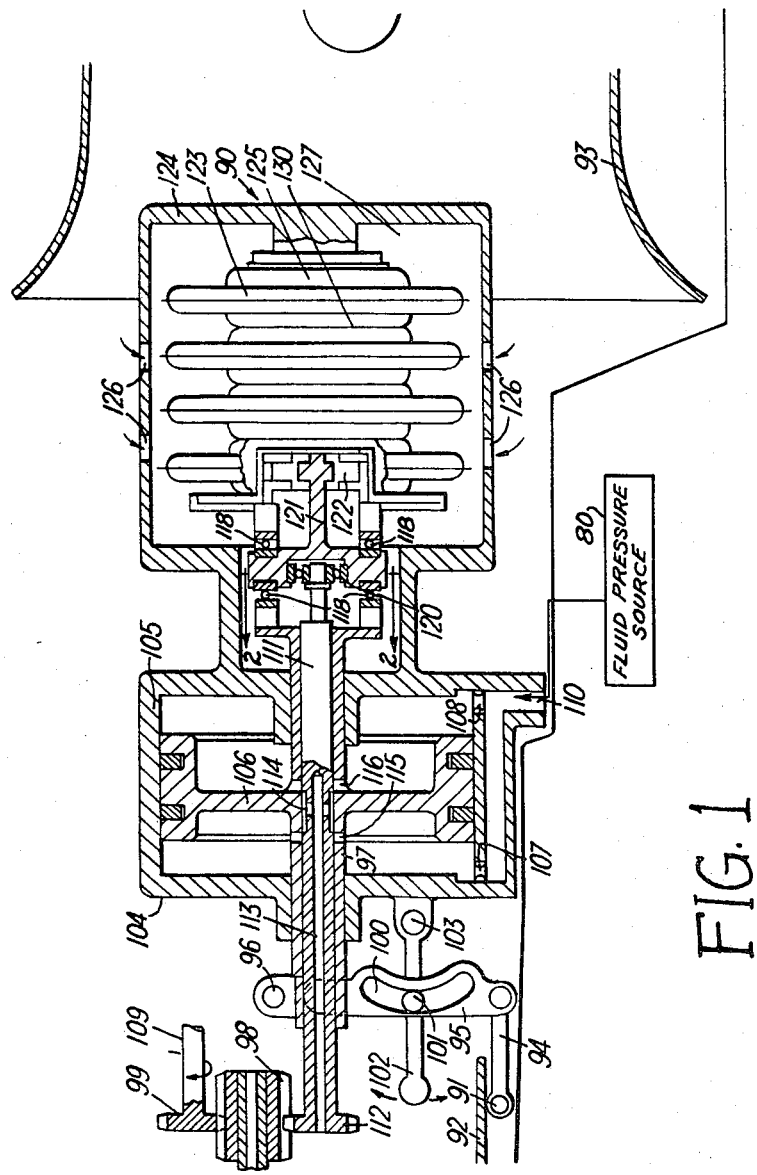

This invention concerns apparatus for controlling the position of a member in accordance with the density of a gas.

According to the present invention, there is provided apparatus for controlling the position of a member in accordance with the density of a gas comprising a chamber, a bellows mounted in said chamber with a space therebetween, said bellows having a space therein, one of said spaces being completely sealed and the other said space being open to a gas of unknown density, the sealed space containing a reference gas, a diaphragm forming a portion of the bellows, opposite sides of the diaphragm being respectively open to the reference gas and to a gas of unknown density, and a servo mechanism connected to said member, said servo mechanism being responsive to any difference in the pressures prevailing in the two said spaces for adjusting the position of said member, the servo mechanism including a piston and a servo valve which controls the position of the piston and which is connected to the central portion of the diaphragm.

Preferably the servo mechanism further includes a sleeve on which the piston is mounted and within which the said servo valve is rotatable, a bearing within which the said servo valve is rotatably mounted, and means for rotating the servo valve to reduce the risk of its sticking in the sleeve. A cylinder may be provided within which the said piston is mounted, a fluid pressure source to which opposite ends of the cylinder are connected, the sleeve having apertures on opposite sides of said piston, and a vent passage in said servo valve, one or other of said apertures being brought into communication with the vent passage in the servo valve on axial movement of the latter.

The invention also includes compressor inlet air density responsive apparatus for a gas turbine engine which includes a member the position of which influences fuel flow, said apparatus comprising a chamber, a bellows mounted in said chamber with a space therebetween, said bellows having a space therein, one of said spaces being completely sealed and the other said space being open to a gas of unknown density, the sealed space containing a reference gas, a diaphragm forming a portion of the bellows, opposite sides of the diaphragm being respectively open to the reference gas and to a gas of unknown density, and a servo mechanism connected to said member, said servo mechanism being responsive to any difference in the pressures prevailing in the two said spaces for adjusting the position of said member, the servo mechanism including a piston and a servo valve which controls the position of the piston and which is connected to the central portion of the diaphragm.

The present invention provides an apparatus for controlling the position of a member in accordance with the density of a gas comprising a chamber, a bellows mounted in said chamber with a space therebetween, said bellows having a space therein, one of said spaces being completely sealed and the other said space being open to a gas of unknown density, the sealed space containing a reference gas, a diaphragm forming a portion of the bellows, opposite sides of the diaphragm being respectively open to the reference gas and to a gas of unknown density, and a servo mechanism connected to said member, said servo mechanism being responsive to any difference in the pressures prevailing in the two said spaces for adjusting the size of the bellows to make said pressures equal, the servo mechanism including a piston, movement of which influences the position of said member, a rotary servo valve which controls the position of the piston and which is connected to the central portion of the diaphragm, a sleeve on which said piston is mounted and within which said servo valve is rotatable, and means for rotating the servo valve to reduce the risk of its sticking in said sleeve.

The present invention also contemplates the provision of an apparatus for controlling the position of a member in accordance with the density of a gas comprising a chamber, a bellows mounted in said chamber with a space therebetween, said bellows having a space therein, one of said spaces being completely sealed and the other said space being open to a gas of unknown density, the sealed space containing a reference gas, a pressure-deformable component forming a portion of the bellows, opposite sides of the said component being respectively open to the reference gas and to a gas of unknown density, and a servo mechanism connected to said member, said servo mechanism being responsive to any difference in the pressures prevailing in the two said spaces for adjusting the size of the bellows to make said pressures equal, the servo mechanism including a piston the movement of which influences the position of said member, and a servo valve which controls the position of the piston and which is connected to said component.

Figure 2:
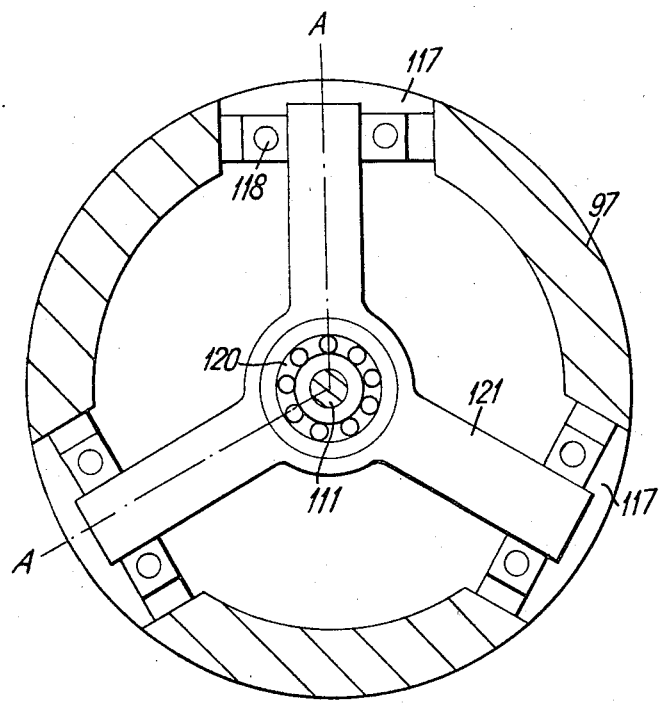

The invention is illustrated, merely by way of example, in the accompanying drawings, in which:

FIGURE 1 is a sectional view taken along the line A—A of FIGURE 2 of an apparatus for controlling the position of a member according to the present invention, and FIGURE 2 is an end view partly in section of part of the apparatus shown in FIGURE 1, and taken along the line 2—2 thereof.

Referring to the drawings, a gas turbine engine fuel system includes a density measuring apparatus 90 for adjusting the position of a roller 91 on an arm 92 in accordance with the density of the compressor inlet air flowing through an engine intake 93. The arm 92 may form part of a balance mechanism (not shown) for adjusting the fuel flow to the engine in dependence upon the balance of various forces acting on the said balance mechanism.

The roller 91 is carried by a link 94 which is pivotally connected to one end of a lever 95. The opposite end of the lever 95 is pivotally connected to an arm 96 mounted at one end of a sleeve 97.

The lever 95 is provided with an arcuate slot 100 within which is received a roller 101 which provides a virtual pivot for the lever 95. The roller 101 is mounted on a pilot's lever 102 which is pivoted at 103 to a ram 104. Thus, as the pilot's lever 102 is moved, the leverage effected by the lever 95 is altered.

The ram 104 has a cylinder 105 within which is mounted a piston 106 which is carried by the sleeve 97. Opposite ends of the cylinder 105 communicate by way of restricted ports 107, 108 respectively with a pipe 110. The pipe 110 is arranged to receive high pressure fuel from a source 80.

Rotatably and slidably mounted within the bore of the sleeve 97 is a servo valve 111 which is provided at its left hand end with a gear 112. The gear 112 meshes with a gear 98 which itself meshes with a gear 99 on an engine driven shaft 109. The servo valve 111 is therefore rotated throughout the oepration of the engine 10. This therefore reduces the risk of the servo valve 111 sticking within the sleeve 97, whereby the servo valve 111 may be moved axially by very light forces.

The servo valve 111 is provided with an axially extending vent passage 113 which communicates with an annular recess 114 in the servo valve 111.

The sleeve 97 is provided on opposite sides of the piston 106 with apertures 115, 116, which are spaced from each other by a distance equal to the axial breadth of the annular recess 114.

Accordingly, when the servo valve 111 is in the posi ion shown in the drawing, the annular recess 114 does not communicate with either the aperture 115 or with the aperture 116, with the result that the pressures on opposite sides of the piston 106 will be the same and the piston 106 will therefore be stationary.

If, however, the servo valve 111 is moved axially, the annular recess 114 will communicate with either the aperture 115 or with the aperture 116, whereby presure fluid will flow from one or other sides of the piston 106, and out through the vent passage 113. This will cause the piston 106 to move in the same direction as the servo valve 111 until the apertures 115, 116 are both out of communication with the annular recess 114. Such movement of the piston 106 will, of course, cause the roller 91 to move along the arm 92.

The right hand end of the servo valve 111, which extends through the wall of a chamber 124, is rotatably mounted in a thrust bearing 120 which is carried by a transmission member 121. The transmission member 121 is connected, at its right hand end (as seen in FIGURE 1), to the central portion of a diaphragm 122 which forms part of, and is provided at the left hand end of, a completely sealed bellows 123. The left-hand end of the transmission member 121 is formed with three equiangularly spaced apart radially extending portions, while the right-hand end of sleeve 97 is formed with a radially enlarged and axially elongated end having axial grooves 117 therein. Ball or roller bearings 118 are mounted between the transmission member 121 and the sleeve 97 to allow axial movement of said member 121 with respect to the sleeve 97. The periphery of the diaphragm 122 is connected to the sleeve 97.

The bellows 123 is mounted in the chamber 124 within which it is freely movable except at its right hand end 125 at which it is anchored to the chamber 124.

The chamber 124 is mounted within the air intake 12 and is provided with apertures 126 so that compressor inlet air at a pressure $P_1$ and a temperature $T_1$ may freely enter the space 127 between the bellows 123 and the chamber 124. A completely sealed space 130 within the bellows 123 contains a reference gas such, for example, as hydrogen.

Opposite sides of the diaphragm 122 are thus respectively open to the pressure of the reference gas and to the pressure $P_1$. If therefore there is any difference in these pressures the diaphragm 122 will flex and cause axial movement of the transmission member 121 which will be transmitted to the valve 111 via the bearing 120. Thus, the servo valve 111 will be moved axially in one direction or the other and uncover port 115 or 116, thereby to cause corresponding axial movement of the piston 106. Movement of piston 106 in turn causes sleeve 97 to move in a direction opposite to the direction of movement of the valve 111 to expand or contract the bellows 123. It will be appreciated that at the end of this movement, the volume of the gas within the bellows 123 will become such that the density of the gas within the bellows 123 will be proportional to the density of the compressor inlet air, the ratio of these densities being in accordance with their molecular weights.

The position of the diaphragm 122 is therefore representative of the density of the compressor inlet and this position determines the location of the roller 91.

I claim:
1. Apparatus for controlling the position of a member in accordance with the density of a gas comprising a chamber, a bellows mounted in said chamber with a space therebetween, said bellows having a space therein, one of said spaces being completely sealed and the other said space being open to a gas of unknown density, the sealed space containing a reference gas, a diaphragm forming a portion of the bellows, opposite sides of the diaphragm being respectively open to the reference gas and to a gas of unknown density, and a servo mechanism connected to said member, said servo mechanism being responsive to any difference in the pressures prevailing in the two said spaces for adjusting the size of the bellows to make said pressures equal, the servo mechanism including a piston, movement of which influences the position of said member, a rotary servo valve which controls the position of the piston and which is connected to the central portion of the diaphragm, a sleeve on which said piston is mounted and within which said servo valve is rotatable, and means for rotating the servo valve to reduce the risk of its sticking in said sleeve.

2. Apparatus as claimed in claim 1 wherein there is provided a cylinder within which the said piston is mounted, a fluid pressure source to which opposite ends of the cylinder are connected, the sleeve having apertures on opposite sides of said piston, and a vent passage in said servo valve, one or other of said apertures being brought into communication with the vent passage in the servo valve on axial movement of the latter.

3. Apparatus for controlling the position of a member in accordance with the density of a gas comprising a chamber, a bellows mounted in said chamber with a space therebetween, said bellows having a space therein, one of said spaces being completely sealed and the other said space being open to a gas of unknown density, the sealed space containing a reference gas, a pressure-deformable component forming a portion of the bellows, opposite sides of the said component being respectively open to the reference gas and to a gas of unknown density, and a servo mechanism connected to said member, said servo mechanism being responsive to any difference in the pressures prevailing in the two said spaces for adjusting the size of the bellows to make said pressures equal, the servo mechanism including a piston the movement of which influences the position of said member, and a servo valve which controls the position of the piston and which is connected to said component.

References Cited
UNITED STATES PATENTS

| | | | |
|---|---|---|---|
| 2,000,308 | 5/1935 | Schutz | 73—30 |
| 2,724,962 | 11/1955 | McMahon | 73—30 |
| 3,137,158 | 6/1964 | Krueger | 73—30 |
| 2,459,542 | 1/1949 | Rosenberger | 73—30 |
| 2,981,111 | 4/1961 | McIlwraith et al. | 73—453 |

FOREIGN PATENTS

| | | |
|---|---|---|
| 296,630 | 5/1965 | Netherlands. |
| 799,614 | 8/1958 | Great Britain. |

RICHARD C. QUEISSER, Primary Examiner.

J. K. LUNSFORD, Assistant Examiner.

U.S. Cl. X.R.

60—108